(12) United States Patent
Sjöberg et al.

(10) Patent No.: US 10,483,042 B2
(45) Date of Patent: Nov. 19, 2019

(54) METHOD OF MANUFACTURING A CAPACITIVE ELECTRICAL DEVICE

(71) Applicant: ABB Schweiz AG, Baden (CH)

(72) Inventors: Peter Sjöberg, Ludvika (SE); Roger Hedlund, Ludvika (SE); Ylva Granbom, Falun (SE)

(73) Assignee: ABB Schweiz AG, Baden (CH)

(*) Notice: Subject to any disclaimer, the term of this patent is extended or adjusted under 35 U.S.C. 154(b) by 182 days.

(21) Appl. No.: 15/740,241

(22) PCT Filed: Jun. 22, 2016

(86) PCT No.: PCT/EP2016/064401
§ 371 (c)(1),
(2) Date: Dec. 27, 2017

(87) PCT Pub. No.: WO2017/001258
PCT Pub. Date: Jan. 5, 2017

(65) Prior Publication Data
US 2018/0197683 A1 Jul. 12, 2018

(30) Foreign Application Priority Data
Jun. 30, 2015 (EP) .................. 15174559

(51) Int. Cl.
*H01G 7/00* (2006.01)
*H01G 4/32* (2006.01)
(Continued)

(52) U.S. Cl.
CPC ............... *H01G 4/32* (2013.01); *B29C 53/56* (2013.01); *B29C 65/52* (2013.01); *B29C 66/43* (2013.01);
(Continued)

(58) Field of Classification Search
CPC .......... H01G 4/32; H01G 4/005; H01G 13/02; B29C 65/52; B29C 66/43; B32B 37/16;
(Continued)

(56) References Cited

U.S. PATENT DOCUMENTS 4,227,035 A 10/1980 Runnels et al.
4,309,999 A * 1/1982 Lueder .................. A61G 10/00
607/81

(Continued)

FOREIGN PATENT DOCUMENTS

DE 1056218 B 4/1959
DE 1929569 U 12/1965
(Continued)

OTHER PUBLICATIONS

He Guang: "Splicing of Plastic Films, Hebei Agricultural Science and Technology", No. 1991/02, published Feb. 28, 1991, p. 7 1 Page.
(Continued)

*Primary Examiner* — Donghai D Nguyen
(74) *Attorney, Agent, or Firm* — Whitmyer IP Group LLC (57) ABSTRACT

A method of manufacturing a capacitive electrical device is disclosed. The method includes a) bonding a first electrical insulation film with a second electrical insulation film to obtain a single electrical insulation film that has a larger surface area than any of the first electrical insulation film and the second electrical insulation film has alone, b) providing a conductive layer onto the single electrical insulation film, and c) winding the single electrical insulation film and the conductive layer around a shaft to obtain a layer of the single electrical insulation film and a layer of the conductive layer wound onto the shaft, thereby forming the capacitive electrical device.

17 Claims, 7 Drawing Sheets

(51) Int. Cl.
*H01B 17/28* (2006.01)
*H01G 13/02* (2006.01)
*B29C 53/56* (2006.01)
*B29C 65/52* (2006.01)
*B29C 65/00* (2006.01)
*B32B 37/16* (2006.01)
*H01G 4/005* (2006.01)
*H01G 4/18* (2006.01)
*B29L 31/34* (2006.01)

(52) U.S. Cl.
CPC ............. *B32B 37/16* (2013.01); *H01B 17/28* (2013.01); *H01G 4/005* (2013.01); *H01G 13/02* (2013.01); *B29K 2995/0005* (2013.01); *B29K 2995/0007* (2013.01); *B29L 2031/3406* (2013.01); *B32B 2307/202* (2013.01); *B32B 2307/206* (2013.01); *B32B 2457/16* (2013.01); *H01G 4/18* (2013.01)

(58) Field of Classification Search
CPC ................ B32B 2457/16; H01B 17/28; Y10T 29/49071
USPC ........................................ 29/25.41
See application file for complete search history.

(56) References Cited

U.S. PATENT DOCUMENTS 6,594,137 B2 * 7/2003 Eriksson ................ H01G 4/015
361/312

9,870,847 B2 * 1/2018 Hedlund .................. H01G 4/32
2011/0094798 A1 4/2011 Low et al.

FOREIGN PATENT DOCUMENTS

| | | |
|---|---|---|
| DE | 2757256 A1 | 6/1979 |
| EP | 3113194 A1 | 1/2017 |
| GB | 1129995 A | 10/1968 |
| GB | 1339259 A | 11/1973 |
| JP | 5539620 A | 3/1980 |
| JP | 5810318 A | 1/1983 |
| JP | 5966012 A | 4/1984 |
| WO | 2014090677 A1 | 6/2014 |

OTHER PUBLICATIONS

Chinese Office Action and Translation Application No. 201680039111.0 Completed: Oct. 31, 2018 9 Pages.
European Search Report Application No. 15174559 Completed Date: Nov. 30, 2015; dated Dec. 7, 2015 7 pages.
International Preliminary Report on Patentability Application No. PCT/EP2016/064401 Completed Date: Oct. 6, 2017 6 pages.
International Search Report & Written Opinion of the International Searching Authority Application No. PCT/EP2016/064401 Completed Date: Aug. 15, 2015; dated Aug. 22, 2015 11 pages.
Written Opinion of the International Preliminary Examining Authority Application No. PCT/EP2016/064401 dated Jun. 19, 2017 6 pages.

* cited by examiner

METHOD OF MANUFACTURING A CAPACITIVE ELECTRICAL DEVICE

TECHNICAL FIELD

The present disclosure generally relates to electrical devices such as transformers and bushings. In particular, it relates to method of manufacturing a capacitive electrical device

BACKGROUND

Electrical devices, such as bushings, cable terminations, and measurement transformers, and capacitors may comprise capacitive electrical devices.

Capacitors, for example, may comprise a conductive layer wound around a shaft together forming a capacitive electrical device. The conductive layer is insulated from another conductive layer by means of an electrical insulator such as an insulating film.

Bushings may comprise a condenser core forming the capacitive electrical device. The condenser core comprises a plurality of conductive layers electrically insulated from each other and extending longitudinally along the electrical device body. In order to improve the electrical withstand strength, the axial length of each conductive layer is shorter than that of the corresponding insulation layers between which a conductive layer is sandwiched.

For large electrical devices the width of the films forming the electrical insulation available on the market may be less than that required by the electrical device. In this case it may be necessary to joint several films or sheets forming the electrical insulation of the capacitive electrical device. One known method of jointing insulating films is by winding films together with an overlap. This overlap creates areas of double film thickness at the joint. Further, this creates areas with high risk of voids and cavities in the vicinity of the overlap joint. This in turn reduces the dielectric strength in the joint area and/or may create partial discharges in service. Such a lap joint will make it difficult or impossible to make a sufficiently homogeneous condenser core of laminated films.

Another method that is utilised today for jointing involves placing papers or other porous films with an overlap and cut the paper in the overlap and removing the excess material, then impregnate the condenser core with an impregnation liquid in a vacuum impregnation process that fills up the cavities, inhomogeneities, and clefts with the fluid. The fluid can also be of the type that solidifies by a curing process, e.g. a resin. This method requires a substantial amount of time for the impregnation and curing process, which increases the manufacturing costs.

GB 1 129 995 A discloses a method of manufacturing an electric insulating bushing. The bushing is made by winding side-by-side on to a former or the like at least two sheets of flexible insulating material, e.g. paper, which initially overlap a distance W and are then cut by a reciprocating cutter in this overlapping region as they are fed forward together on to the former to produce complementary abutting serrated or tapered edges. Layers of foil may be interleaved with the insulating sheeting to reduce electric stress. The insulation may be increased by impregnating the bushing material with, for example, an insulating oil or gas, or a plastics resin that may be cured during fabrication of the bushing by using heated rollers.

DE 27 57 256 A1 discloses coaxial insulation for a cable and uses a signal inner conductor, or a rigid inner tube round a flexible inner conductor, as a winding mandrel for insulation tape, or web. Several such insulating webs are continuously applied to the winding mandrel in overlapping manner. The overlaps of two adjacent webs are so trimmed, prior to contacting the winder, as to form a narrow gap, between two adjacent webs. The winding mandrel and the web cutting device can be axially shifted, when one of them is stationary. Thus the gaps in individual lengths are covered. Alternately gaps in several layers may be covered by the top one.

GB 1 339 259 A discloses a method of manufacturing a bushing where two lengths of insulating sheet material are wound around a former. This document aims to manufacture a bushing in which the axial length of the insulator substantially exceeds the width of the paper or other insulating sheet material used. The figure below shows that the two pieces of insulation 11 and 12 are arranged in an overlapping manner forming overlaps 15 and 16, wherein a cutter 17 cuts the overlapping portion as the insulation is rolled onto the former 13. In this way the adjacent obliquely severed straight edges of the two lengths of paper will be laid in edge-to-edge abutted relationship, forming a butt joint of helical spiral form and of constant axial pitch. The completed bushing insulator may be impregnated may be impregnated by a vacuum process with a liquid casting resin, which when cured will bond the turns of the paper winding together.

SUMMARY

An object of the present disclosure is to provide a method of manufacturing a capacitive electrical device with jointed films which solves or at least mitigates existing problems of the state of the art.

Hence, according to a first aspect of the present disclosure there is provided a method of manufacturing a capacitive electrical device, wherein the method comprises: a) bonding a first electrical insulation film with a second electrical insulation film to obtain a single electrical insulation film that has a larger surface area than any of the first electrical insulation film and the second electrical insulation film has alone, b) providing a conductive layer onto the single electrical insulation film, and c) winding the single electrical insulation film and the conductive layer around a shaft to obtain a layer of the single electrical insulation film and a layer of the conductive layer wound onto the shaft, thereby forming the capacitive electrical device.

By means of the jointing process in which the first electrical insulation film and the second electrical insulation film are bonded to form a single electrical insulation film prior to them being wound around the shaft. By means of bonding, a capacitive electrical device without any significant inhomogeneities or voids may be created. The joint can be created during the winding process without any post-processing of the condenser core. No impregnation process is necessary to obtain a single electrical film with essentially uniform dielectric properties of the single electrical insulation film, also in the joint between the first electrical insulation film and the second electrical insulation film.

One embodiment comprises, prior to step a), placing a first edge of the first electrical insulation film and a second edge of the second electrical insulation film towards each other to obtain a slot between the first electrical insulation film and the second electrical insulation film, wherein step a) involves applying a bonding agent into the slot and onto the first edge and the second edge to thereby bond the first electrical insulation film to the second electrical insulation film.

One embodiment comprises, prior to step b), removing excessive bonding agent material from the surfaces of the single electrical insulation film.

According to one embodiment step a) involves moving an injection tool parallel with the slot along the entire first edge and the entire second edge, wherein the bonding agent is provided into the slot by the injection tool as the injection tool moves relative to the first electrical insulation film and the second electrical insulation film, along the entire first edge and the entire second edge.

According to one embodiment the placing involves placing the first electrical insulation film and the second electrical insulation film on a first roll, and feeding the first electrical insulation film and the second electrical insulation film towards a nozzle by rotating the first roll, wherein step a) involves applying the bonding agent into the slot by means of the nozzle, and a') shaping the bonding agent in the slot by rolling the single electrical insulation film between the first roll and a second roll.

According to one embodiment the bonding agent is glue or a thermoplastic material.

One embodiment comprises, prior to step a), placing a first end portion of the first electrical insulation film to overlap a second end portion of the second electrical insulation film to obtain an overlapping portion, wherein step a) involves heating the overlapping portion to bond the first electrical insulation film with the second electrical insulation film.

According to one embodiment the first end portion includes a first edge of the first electrical insulation film and the second end portion includes a second edge of the second electrical insulation film, wherein step a) involves moving a heating tool along the overlapping portion, parallel with and along the entire extension of the first edge and the second edge.

One embodiment comprises a step a") of removing excessive material from the surface of the single electrical insulation film created in step a), prior to step b).

One embodiment comprises, after step a), rolling the overlapping portion between a first roll and a second roll to smoothen the single electrical insulation film.

According to one embodiment the first roll and the second roll are heated such that the highest temperature of each of the first roll and the second roll is a respective section contacting the overlapping portion.

According to one embodiment step a) involves bonding the first electrical insulation film with the second electrical insulation film such that the single electrical insulation film obtains a longer axial extension than any of the first electrical insulation film and the second electrical insulation film alone, with the axial extension being defined in the axial direction of the shaft.

According to one embodiment the condenser core is a condenser core for a medium voltage electrical device or a high voltage electrical device.

According to one embodiment the conductive layer is a conductive foil.

According to a second aspect of the present disclosure there is provided a capacitive electrical device obtainable by the method according to the first aspect.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
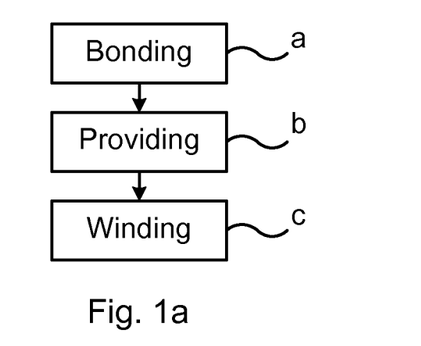
FIGS. 1a-c illustrate flow charts of methods of manufacturing a capacitive electrical device.
Figure 1B:
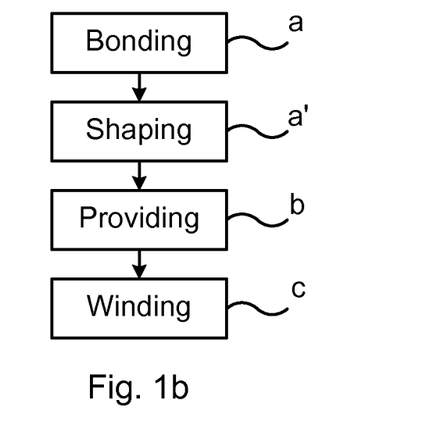
Figure 1C:
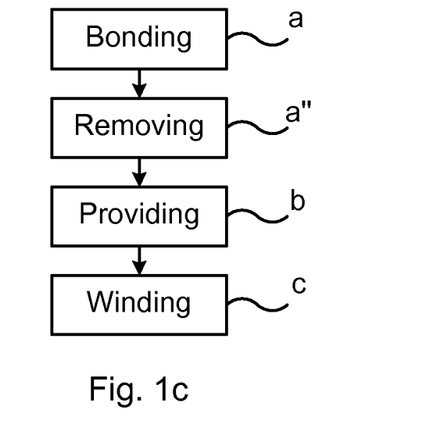

The present disclosure relates to a method of manufacturing a capacitive electrical device. With reference to FIG. 1a, the method includes a) bonding a first electrical insulation film with a second electrical insulation film to create a single electrical insulation film. The single electrical insulation film has a larger surface area than any of the first electrical insulation film and the second electrical insulation film has alone. To this end, the bonding in step a) is a jointing of the first electrical insulation film and the second electrical insulation film.

The first electrical insulation film and the second electrical insulation film are bonded in such a way that the joint formed between them has essentially the same thickness as the thickness of any of the first electrical insulation film and the second electrical insulation film. This essentially uniform thickness of the single electrical insulation film may for example be obtained by mechanically tooling or shaping the joint post bonding, as will be described in more detail in the following.

Each of the first electrical insulation film and the second electrical insulation film may for example be made of polymer e.g. a thermoplastic film, fibreglass web, or glass. In particular, the first electrical insulation film and the second electrical insulation films may be made of a material or a material combination which is able to withstand high temperatures developed when in use.

In a step b) a conductive layer is provided onto the single electrical insulation film. The conductive layer may for example be a foil, or it may be a coating applied to the single electrical insulation film. In the case of a coating, the coating may for example be a conductive compound layer such as conductive ink or conductive polymer, or it may be a metallization layer. The coating may for example be applied by means of physical vapour deposition, or by printing by means of a printing device. Such printing technology may for example be based on screen-printing, ink jet printing, intermittent web coating or slot die coating.

In a step c) the single electrical insulation film and the conductive layer which is provided on the single electrical insulation film are concurrently wound around a shaft to obtain a layer of the single electrical insulation film and a layer of the conductive layer wound onto the shaft. The shaft and the single electrical insulation film wound around the shaft hence form a capacitive electrical device.

Examples of capacitive electrical devices obtainable by means of the above-described process are condenser cores and capacitors. In the case of a capacitor, the capacitive electrical device may comprise a second conductive layer electrically insulated from a first conductive layer by means of the single electrical insulation film. In this case, in step b) a respective conductive layer may be provided on each of the two opposite surfaces of the single electrical insulation film. In step c) the single electrical insulation film and the two conductive layers arranged on either side of the single electrical insulation film may be wound around the shaft.

In the case the capacitive electrical device is a condenser core, a number of regions may be provided with a conductive layer on the single electrical insulation film. Those regions which are not provided with a conductive layer define electrically insulating regions of capacitive electrical device. The single electrical insulation film provided with a number of regions of conductive layers is wound around the shaft in step c) and thus forms a condenser core. Thereby a plurality of electrically insulating layers and electrically conductive layers are obtained around the shaft.

With reference to FIGS. 1b to 7d, a number of examples of how to manufacture a capacitive electrical device for an electrical device will be described in more detail.

Figure 2A:
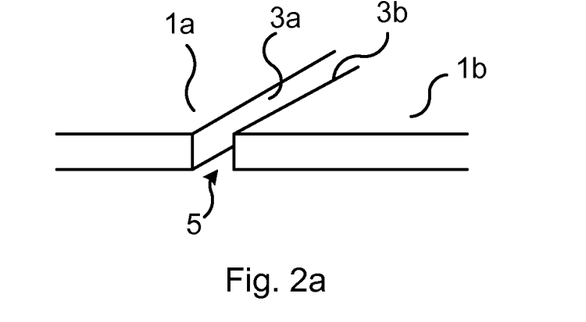
FIGS. 2a-c show a first example of a bonding a first electrical insulation film with a second electrical insulation film for manufacturing a capacitive electrical device.

FIG. 2a shows a first example of bonding a first electrical insulation film 1a with a second electrical insulation film 1b. In FIG. 2a, the first electrical insulation film 1a and the second electrical insulation film 1b are placed with their edges towards each other. In particular, a first edge 3a of the first electrical insulation film 1a is placed adjacent to and parallel with a second edge 3b of the second electrical insulation film 1b. The first edge 3a and the second edge 3b are placed at a slight distance from each other such that a slot 5 is formed between the first electrical insulation film 1a and the second electrical insulation system 1b.

Figure 2B:
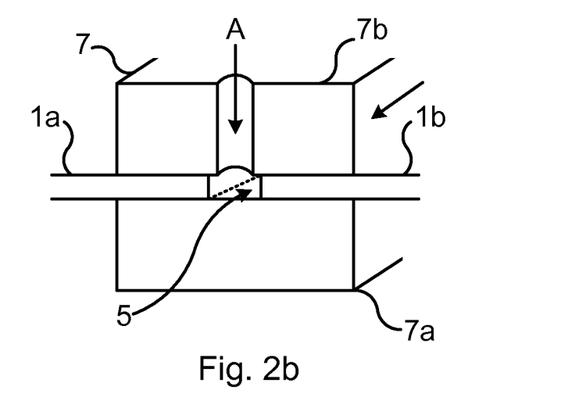

In FIG. 2b an injection tool 7 is shown placed around the slot 5 such that the injection tool can inject a bonding agent into the slot 5, as shown by means of arrow A. The injection tool 7 is arranged to move relative to the slot 5, parallel with the first edge 3a and the second edge 3b, along the entire length of the first edge 3a and the entire length of the second edge 3b. For this purpose, the injection tool 7 could for example be movable along the slot 5 with the first electrical insulation film 1a and the second electrical insulation film 1b being spatially still, or alternatively or additionally the first electrical insulation film 1a and the second electrical insulation film 1b may be arranged to move for example by means of feed rolls to obtain relative movement with respect to the injection tool 7. The first electrical insulation film 1a and the second electrical insulation film 1b, and in particular the slot 5 could thereby be moved past the injection tool 7 such injection tool 7 can fill the slot 5 with the bonding agent.

Figure 2C:
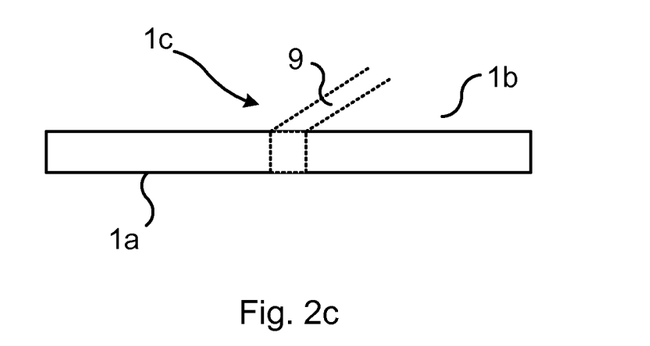

In FIG. 2c, a single electrical insulation film 1c is shown, having been formed by bonding the first electrical insulation film 1a and the second electrical insulation film 1b. The bonding agent thus fills the slot 5, and adheres to the first edge 3a and to the second edge 3b. A joint 9 is hence formed between the first electrical insulation film 1a and the second electrical insulation film 1b. The single electrical insulation film 1c may then be used in steps b) and c) to manufacture the capacitive electrical device.

The injection tool 7 may have a first part 7a bearing against the first electrical insulation film 1a and the second electrical insulation film 1b and arranged at one side of the slot 5. The first part 7a has an essentially planar surface and forms a floor for the slot 5. The injection tool 7 also has a second part 7b arranged at the opposite side of the slot 5. The second part 7b includes a runner into which the bonding agent may be injected. The bonding agent that has been provided into the slot 5 is shaped as the injection tool 7 moves relative to the films 1a and 1b along the slot 5. In this way the single electrical insulation film 1c created by jointing of the films 1a and 1b may obtain an essentially uniform thickness.

Figure 3:
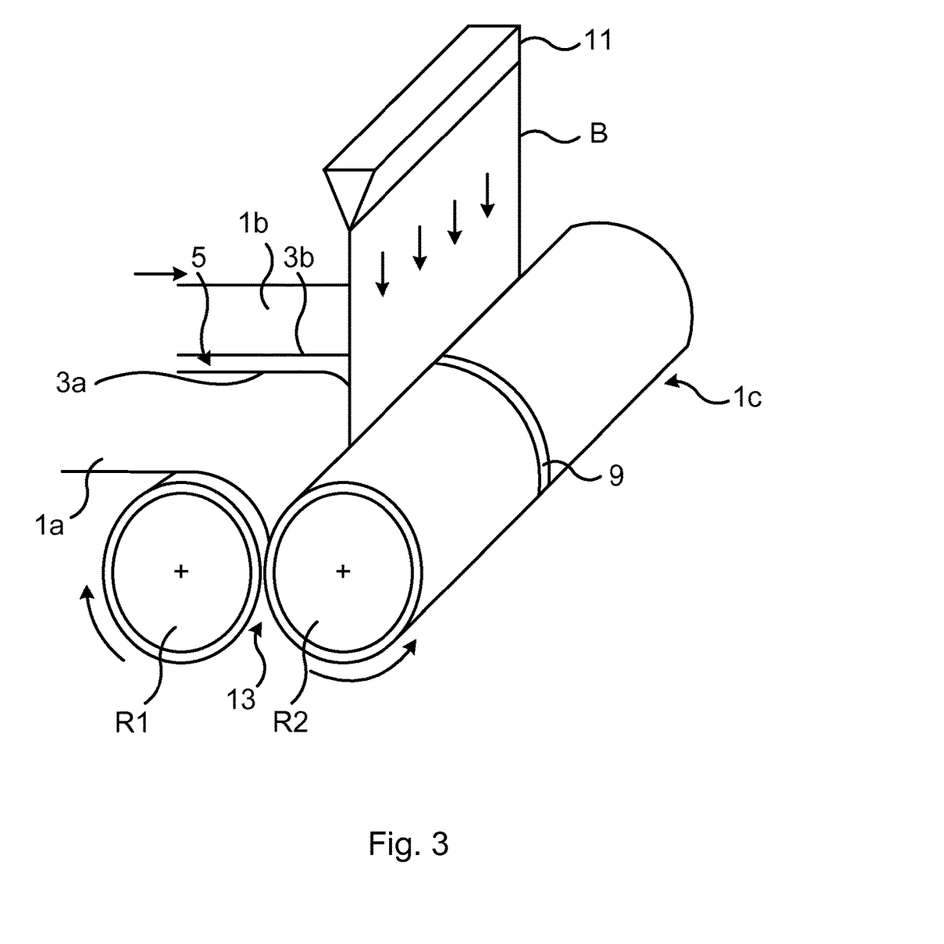
FIG. 3 shows a second example of a bonding of a first electrical insulation film with a second electrical insulation film for manufacturing a capacitive electrical device.

With reference to FIG. 3 a second example of bonding a first electrical insulation film 1a with a second electrical insulation film 1b is shown. According to this example, the first electrical insulation film 1b is placed with its first edge 3a towards the second edge 3b of the second electrical insulation film 1b such that a slot 5 is created between the first electrical insulation film 1a and the second electrical insulation film 1b. The first electrical insulation film 1a and the second electrical insulation film 1b are placed on a first roll R1 which feeds the two films 1a and 1b forward towards a nozzle 11. The nozzle 11 is essentially as wide as the combined width of the two films 1a, 1b when placed beside each other on the first roll R1. A second roll R2 is arranged adjacent to the first roll R1 such that a small gap 13 is created between the first roll R1 and the second roll R2. The gap 13 is just large enough that the films 1a and 1b can pass through. The nozzle 11 is placed above the gap 13 between the first roll R1 and the second roll R2. The nozzle 11 is arranged to deliver a bonding agent B into the slot 5 and onto the first electrical insulation film 1a and the second electrical insulation film 1b, as the films 1a and 1b move into the gap 13 and are pressed between the first roll R1 and the second roll R2. The first roll R1 and the second roll R2 rotate in opposite directions and the single electrical insulation film 1c created by the bonding of the two films 1a and 1b by means of the bonding agent B may be rolled onto the second roll R2.

The nozzle can alternatively be placed with an offset from the gap 13, above either the first roll R1 or above the second roll R2. Thereby the heated liquid bonding agent B discharged from the nozzle may be allowed to slightly cool before reaching the gap 13. Any dripping of the bonding agent B applied to the first film 1a and the second film 1b may thereby be reduced.

The single electrical insulation film 1c is shaped in a step a') by means of the first roll R1 and the second roll R2 when fed between these rolls. A conductive layer may be provided onto the single electrical insulation film 1c obtained in this manner in step b) and wound onto a shaft to form a capacitive field gradient device in step c). In particular, the conductive layer may advantageously be provided by means of printing or spraying. The conductive layer can for example be applied as the single electrical insulation film $1c$ is rolled onto the second roll R2. For this purpose, a conductive layer application device may be arranged to the right of the second roll R2 in FIG. 3.

According to one variation, the second roll R2 may be the shaft of the capacitive electrical device created in the process described in FIG. 3. The second roll R2 may thus be removed when the single electrical insulation film $1c$ has been fully wound around the second roll R2.

FIGS. 4a-d show a third example of bonding a first electrical insulation film $1a$ with a second electrical insulation film $1b$. The first electrical insulation film $1a$ and the second electrical insulation film $1b$ are placed beside each other with the first edge $3a$ facing the second edge $3b$ as has been described above. An injection tool $7'$ is placed around the slot $5$ formed between the first electrical insulation film $1a$ and the second electrical insulation film $1b$. The injection tool $7'$ has a cavity $15$ into which a bonding agent may be provided in order to fill the slot $5$ with the bonding agent to thereby form a single electrical insulation film. The injection tool $7'$ is movable parallel to the first edge $3a$ and the second edge $3b$, along the entire extension of the first edge $3a$ and the entire extension of the second edge $3b$. The injection tool $7'$ may be moved along the slot $5$ or the films $1a$, $1b$ may be arranged to move while the injection tool $7'$ is arranged spatially fixed.

Figure 4A:
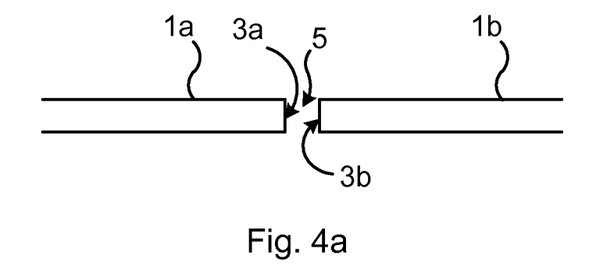
FIGS. 4a-d show a third example of a bonding of a first electrical insulation film with a second electrical insulation film for manufacturing a capacitive electrical device.
Figure 4B:
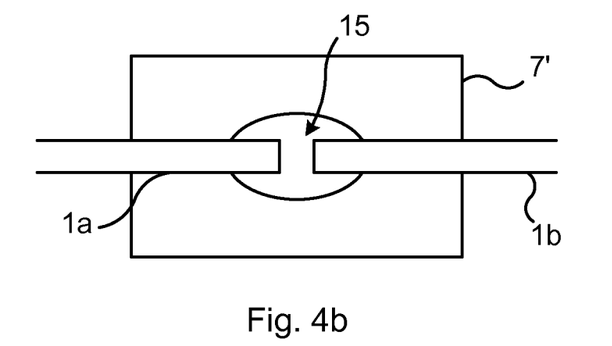
Figure 4C:
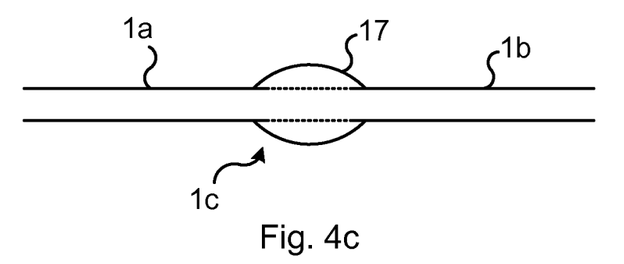
Figure 4D:
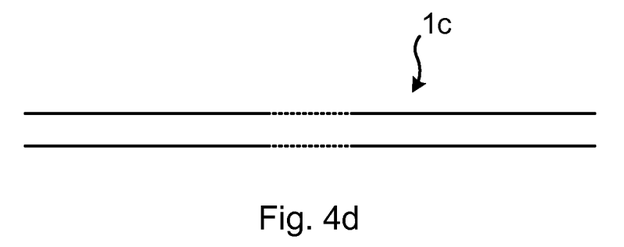

In FIG. 4c, a single electrical insulation film $1c$ has been obtained by means of the bonding process shown in FIG. 4b. Excessive bonding agent material $17$ present after the bonding step may be removed from the surfaces of the single electrical insulation film $1c$. In this manner an essentially uniformly thick single electrical insulation film $1c$ may be obtained, as shown in FIG. 4c.

Figure 5:
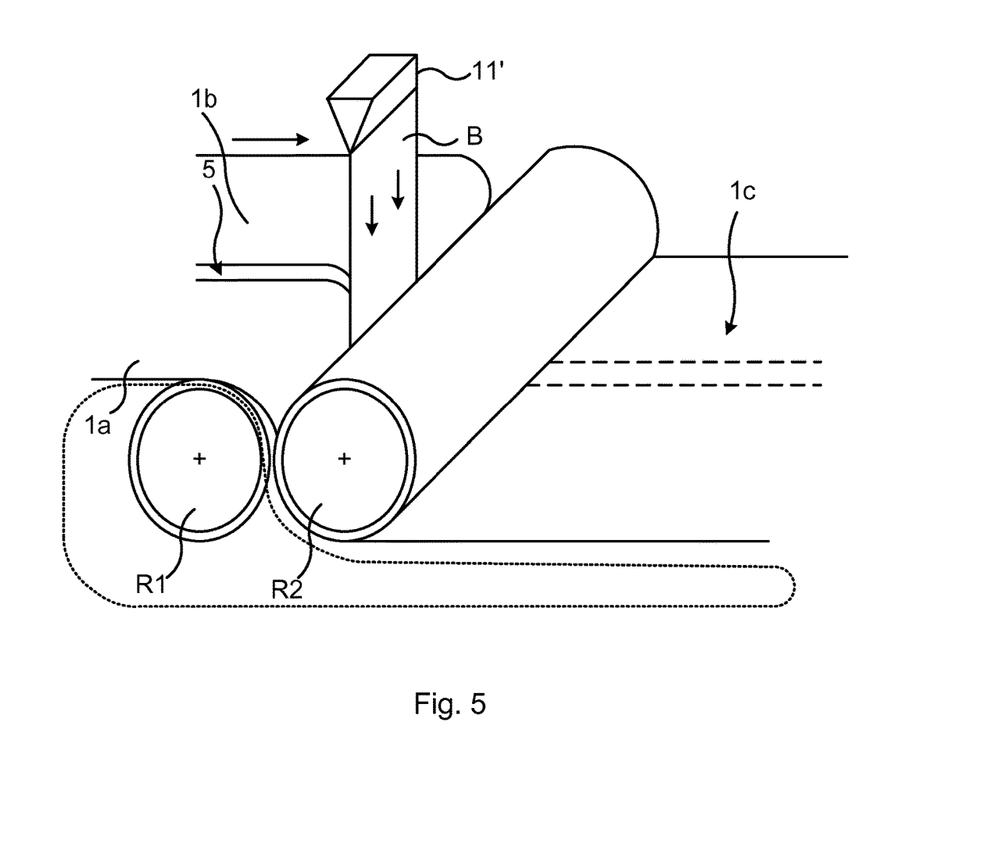
FIG. 5 shows a fourth example of a bonding of a first electrical insulation film with a second electrical insulation film for manufacturing a capacitive electrical device.
Figure 6A:
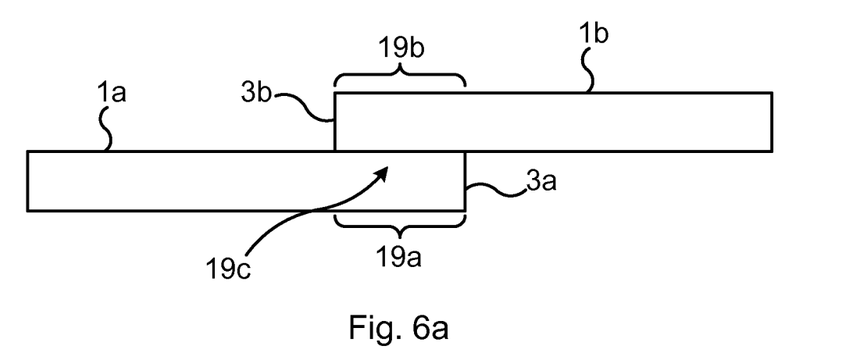
FIGS. 6a-d show a fifth example of a bonding of a first electrical insulation film with a second electrical insulation film for manufacturing a capacitive electrical device.
Figure 6B:
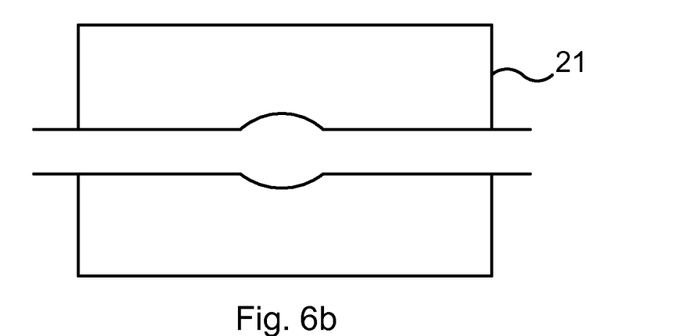
Figure 6C:
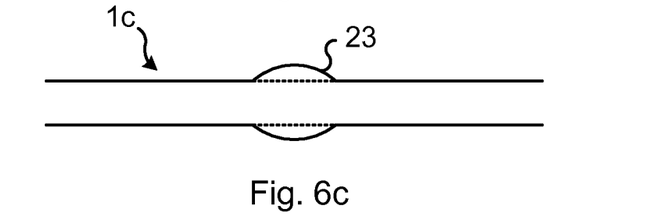
Figure 6D:
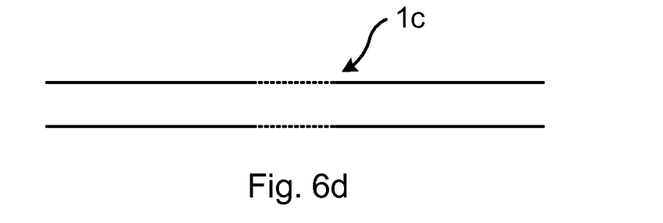
Figure 7A:
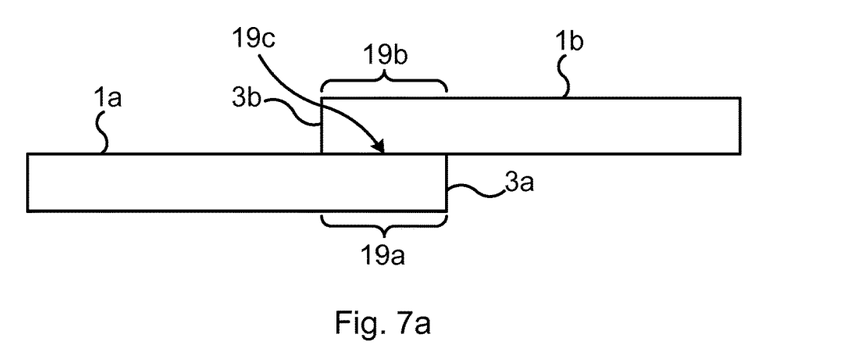
FIGS. 7a-d show a sixth example of a bonding of a first electrical insulation film with a second electrical insulation film for manufacturing a capacitive electrical device.
Figure 7B:
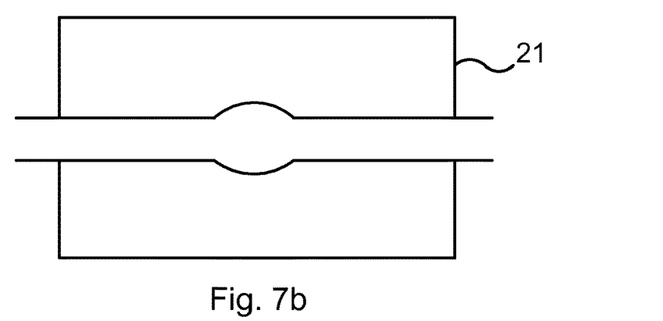
Figure 7C:
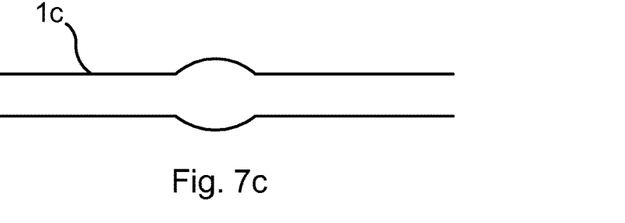
Figure 7D:
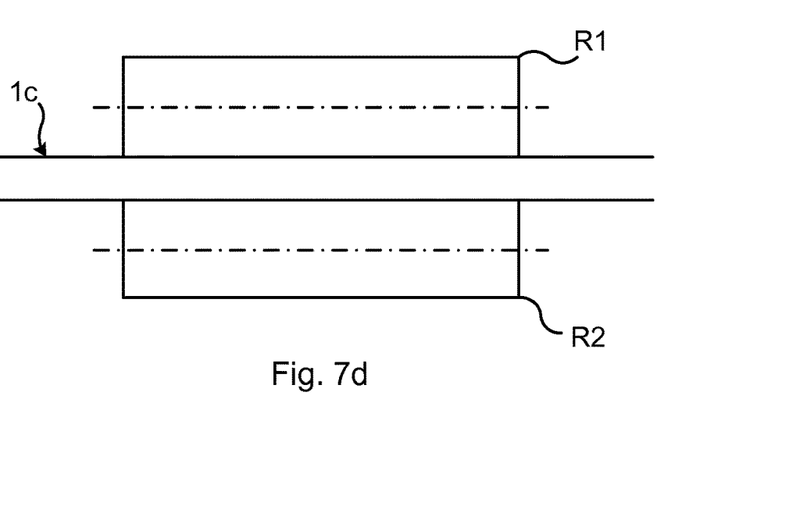

FIG. 5 shows a fourth example of bonding the first electrical insulation film $1a$ with the second electrical insulation film $1b$. This example is similar to the second example, except that the nozzle $11'$ is narrower and the single electrical insulation film $1c$ formed by the bonding process is further fed forward when it has passed between the first roll R1 and the second roll R2. The narrower nozzle $11'$ applies the bonding agent B to the slot $5$, wherein most of the applied bonding agent B is limited to being distributed in the vicinity of the slot $5$. The amount of bonding agent B is adapted to minimise the amount of spill.

A conductive layer may be provided onto the single electrical insulation film $1c$, and the single electrical insulation film $1c$ and the conductive layer may be rolled concurrently onto a shaft to form a capacitive electrical device in steps b) and c).

The nozzle can according to one variation be placed with an offset from the gap, above either the first roll R1 or above the second roll R2. Thereby the heated liquid bonding agent B discharged from the nozzle may be allowed to slightly cool before reaching the gap $13$. Any dripping of the bonding agent B applied to the first film $1a$ and the second film $1b$ may thereby be reduced.

According to one variation, the arrangement for jointing includes an endless belt onto which the first electrical insulation film $1a$ and the second electrical insulation film $1b$ is placed prior to being bonded together. The path of the endless belt is schematically shown by means of the loop formed by the dashed lines in FIG. 5. The endless belt provides support for the first electrical insulation film $1a$, the second electrical insulation film $1b$, and also to the single electrical insulation film $1c$ once the two films $1a$ and $1b$ have been joined. It may thereby be ensured that the first electrical insulation film $1a$ and the second electrical insulation film $1b$ are bonded together properly.

FIGS. 6a-d shows a fifth example of bonding a first electrical insulation film $1a$ with a second electrical insulation film $1b$. A first end portion $19a$ of the first electrical insulation film $1a$ is placed to overlap a second end portion $19b$ of the second electrical insulation film $1b$ to obtain an overlapping portion $19c$. In this case step a) involves heating the overlapping portion $19c$ to bond the first electrical insulation film $1a$ with the second electrical insulation film $1b$. For this purpose a heating tool $21$ may be used. The heating tool $21$ may be moved along the overlapping portion $19c$, parallel with and along the entire extension of the first edge $3a$ and the second edge $3b$. In this manner the first electrical insulation film $1a$ and the second electrical insulation film $1b$ may be welded together by means of the heating tool $21$. The resulting single electrical insulation film $1c$ may become deformed by the heating procedure. To this end, excessive material $23$ is in a step a") removed from the surface of the single electrical insulation film $1a$ created in the above-described step a) of bonding prior to step b) is performed.

According to one variation, in use the heating tool $21$ may have a temperature gradient which increases towards that portion which is arranged to heat the overlapping portion $19c$.

FIGS. 7a-d shows a sixth example of bonding a first electrical insulation film $1a$ with a second electrical insulation film $1b$. This example is similar to the fifth example, except that after bonding the single electrical insulation film $1a$ is shaped by means of a first roll R1 and a second roll R2. In particular, the overlapping portion $19c$ is fed between the first roll R1 and the second roll R2 to smooth out the single electrical insulation film $1c$. A more uniform thickness of the single electrical insulation film $1a$ may thereby be obtained.

According to one variation of the sixth example the first roll R1 and the second roll R2 may be heated such that the highest temperature of each of the first roll R1 and the second roll R2 is a respective section contacting the overlapping portion $19c$. Hereto, each of the first roll R1 and the second roll R2 may have a heat gradient which increases e.g. towards the middle where they are contacting the overlapping portion $19c$.

In any example disclosed herein, the bonding agent may for example be a glue or a thermoplastic material. Removal of excessive bonding material, or excessive material, resulting from the bonding step may for example be performed by ablation, e.g. laser ablation, a mechanical removal process, thermal melting or combinations of different removal techniques.

By means of the examples of manufacturing the capacitive electrical device disclosed herein the joint formed between the films $1a$ and $1b$ may have essentially the same thickness as the rest of the single electrical insulation film. This results in a lower risk of voids and thus increases the dielectric withstand strength of the single electrical insulation film.

The capacitive field gradient device may in particular be suitable for electrical devices such as bushings, cable terminations, measurement transformers and capacitors. The capacitive field gradient device may be suitable for medium voltage or high voltage applications, for example high voltage direct current (HVDC) applications. Example voltages are from 1 kV to over 1000 kV, for example 10 kV and above.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of manufacturing a capacitive electrical device, wherein the method comprises:
   a) bonding a first electrical insulation film with a second electrical insulation film to obtain a single electrical insulation film that has a larger surface area than any of the first electrical insulation film and the second electrical insulation film has alone,
   b) providing a conductive layer onto the single electrical insulation film, and
   c) winding the single electrical insulation film and the conductive layer around a shaft concurrently to obtain a layer of the single electrical insulation film and a layer of the conductive layer wound onto the shaft for forming the capacitive electrical device,
   the first electrical insulation film and the second electrical insulation film being bonded to form the single electrical insulation film prior to them being wound around the shaft.

2. The method according to claim 1, including prior to step a), placing a first edge of the first electrical insulation film and a second edge of the second electrical insulation film towards each other to obtain a slot between the first electrical insulation film and the second electrical insulation film, wherein step a) involves applying a bonding agent into the slot and onto the first edge and the second edge to thereby bond the first electrical insulation film to the second electrical insulation film.

3. The method according to claim 2, including prior to step b), removing excessive bonding agent material from surfaces of the single electrical insulation film.

4. The method according to claim 3, wherein step a) involves moving an injection tool parallel with the slot along the entire first edge and the entire second edge, wherein the bonding agent is provided into the slot by the injection tool as the injection tool moves relative to the first electrical insulation film and the second electrical insulation film, along the entire first edge and the entire second edge.

5. The method according to claim 2, wherein step a) involves moving an injection tool parallel with the slot along the entire first edge and the entire second edge, wherein the bonding agent is provided into the slot by the injection tool as the injection tool moves relative to the first electrical insulation film and the second electrical insulation film, along the entire first edge and the entire second edge.

6. The method according to claim 2, wherein the placing involves placing the first electrical insulation film and the second electrical insulation film on a first roll, and feeding the first electrical insulation film and the second electrical insulation film towards a nozzle by rotating the first roll, wherein step a) involves applying the bonding agent into the slot by the nozzle, and a') shaping the bonding agent in the slot by rolling the single electrical insulation film between the first roll and a second roll.

7. The method according to claim 2, wherein the bonding agent is glue or a thermoplastic material.

8. The method according to claim 1, including prior to step a), placing a first end portion of the first electrical insulation film to overlap a second end portion of the second electrical insulation film to obtain an overlapping portion, wherein step a) involves heating the overlapping portion to bond the first electrical insulation film with the second electrical insulation film.

9. The method according to claim 8, wherein the first end portion includes a first edge of the first electrical insulation film and the second end portion includes a second edge of the second electrical insulation film, wherein step a) involves moving a heating tool along the overlapping portion, parallel with and along the entire extension of the first edge and the second edge.

10. The method according to claim 9, including a step a") of removing excessive material from surface of the single electrical insulation film created in step a), prior to step b).

11. The method according to claim 9 including, after step a), rolling the overlapping portion between a first roll and a second roll to smoothen the single electrical insulation film.

12. The method according to claim 8, including a step a") of removing excessive material from surface of the single electrical insulation film created in step a), prior to step b).

13. The method according to claim 8, including, after step a), rolling the overlapping portion between a first roll and a second roll to smoothen the single electrical insulation film.

14. The method according to claim 13, wherein the first roll and the second roll are heated such that the highest temperature of each of the first roll and the second roll is a respective section contacting the overlapping portion.

15. The method according to claim 1, wherein step a) involves bonding the first electrical insulation film with the second electrical insulation film such that the single electrical insulation film obtains a longer axial extension than any of the first electrical insulation film and the second electrical insulation film alone, with the axial extension being defined in the axial direction of the shaft.

16. The method according to claim 1, wherein the capacitive electrical device is a capacitive electrical device for a medium voltage electrical device or a high voltage electrical device.

17. The method according to claim 1, wherein the conductive layer is a conductive foil.

* * * * *